United States Patent
Lee et al.

(10) Patent No.: US 9,893,810 B2
(45) Date of Patent: Feb. 13, 2018

(54) RECEIVER OPTICAL MODULE

(71) Applicant: ELECTRONICS AND TELECOMMUNICATIONS RESEARCH INSTITUTE, Daejeon (KR)

(72) Inventors: Seo Young Lee, Daejeon (KR); Young Tak Han, Daejeon (KR); Jong Hoi Kim, Daejeon (KR); Joong Seon Choe, Daejeon (KR); Chun Ju Youn, Daejeon (KR); Hyun Do Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 2 days.

(21) Appl. No.: 15/133,945

(22) Filed: Apr. 20, 2016

(65) Prior Publication Data
US 2016/0336368 A1    Nov. 17, 2016

(30) Foreign Application Priority Data
May 13, 2015    (KR) .................. 10-2015-0066734

(51) Int. Cl.
H01L 31/0232    (2014.01)
H04B 10/25    (2013.01)
G02B 6/00    (2006.01)

(52) U.S. Cl.
CPC ........... *H04B 10/2504* (2013.01); *G02B 6/00* (2013.01)

(58) Field of Classification Search
CPC ..... H04B 10/2504; G02B 6/00; G02B 6/4274
(Continued)

(56) References Cited

U.S. PATENT DOCUMENTS
9,229,183 B2    1/2016 Park et al.
2004/0037512 A1    2/2004 Cho et al.
(Continued)

FOREIGN PATENT DOCUMENTS
KR    10-2012-0054209 A    5/2012
KR    10-2014-0029564 A    3/2014

OTHER PUBLICATIONS

Kwang-Seong Choi et al., "Development of Packaging Technologies for High-Speed (>40Gb/s) Optical Modules", IEEE Journal of Selected Topics in Quantum Electronics, vol. 12, No. 5, pp. 1017-1024, Sep./Oct. 2006.
(Continued)

Primary Examiner — Long K Tran
(74) Attorney, Agent, or Firm — Rabin & Berdo, P.C.

(57) ABSTRACT

There is provided a receiver optical module including a photodetector having a plurality of channels, a capacitor disposing block formed on an upper portion of the photodetector, a plurality of capacitors formed on the capacitor disposing block, and an electrical wiring configured to connect the plurality of capacitors to electrodes of a plurality of channels of the photodetector, wherein the plurality of capacitors are formed on the capacitor disposing block such that distance between the capacitors and the electrodes of the corresponding channels are the same. Distortion and loss of signal characteristics of high frequency can be reduced and quality of a signal can be enhanced.

14 Claims, 4 Drawing Sheets

(58) Field of Classification Search
USPC .......................................... 257/432; 398/214
See application file for complete search history.

(56) References Cited

U.S. PATENT DOCUMENTS

| | | | |
|---|---|---|---|
| 2007/0133933 A1 | 6/2007 | Yoon et al. | |
| 2012/0106984 A1* | 5/2012 | Jones .................. | H04L 27/223 |
| | | | 398/214 |
| 2015/0063832 A1* | 3/2015 | Park ..................... | G02B 6/4274 |
| | | | 398/214 |
| 2015/0260933 A1* | 9/2015 | Masuyama .......... | G02B 6/4274 |
| | | | 385/14 |
| 2016/0116694 A1 | 4/2016 | Han et al. | |

OTHER PUBLICATIONS

Jianbiao Pan, Phd et al., "Wire Bonding Challenges in Optoelectronics Packaging", Proceedings of the 1$^{st}$ SME Annual Manufacturing Technology Summit: Dearborn, MI, Aug. 1, 2004.

Charles L. Goldsmith et al., "Principles and Performance of Traveling-Wave Photodetector Arrays", IEEE Transactions on Microwave Theory and Techniques, vol. 45, No. 8, pp. 1342-1350, Aug. 1997.

* cited by examiner

RECEIVER OPTICAL MODULE

CROSS-REFERENCE TO RELATED APPLICATION

This application claims priority to and the benefit of Korean Patent Application No. 10-2015-0066734, filed on May 13, 2015, in the Korean Intellectual Property Office, the entire contents of which are incorporated herein by reference in their entirety.

BACKGROUND

1. Field

An embodiment of the present invention relates to a broadcasting communication module, and more particularly, to a receiver optical module structure 2. Description of the Related Art An optical receiver module (or a receiver optical module) may include an optical signal input unit, a photoelectric conversion unit, a high frequency signal amplifying/processing unit, and a high frequency signal output unit. In particular, an optical receiver module receiving a signal of 10 Gbps or higher should be designed and manufactured in consideration of loss, reflection, and resonance of a high frequency signal with respect to module components and a layout structure of the components. Meanwhile, in order to electrically connect the components, wire bonding or flip-chip bonding using solder may be used. Here, when a connection structure passing through a wire or solder from a high frequency signal is not proper, impedance mismatch of a transmission signal is brought about to degrade high frequency signal characteristics of an optical module.

In particular, in order to smoothly operate a photodetector of a photoelectric conversion unit with radio frequency, a return path is required to be present in a ground of a high frequency signal in an area sufficiently adjacent to the photodetector. In this case, the return path of the high frequency signal may be formed by using a capacitor element, and characteristics of a high frequency output signal may be sensitively changed according to a length or shape of wire bonding between an optical receiver and the capacitor element.

When a capacitor is integrated within an adjacent wiring circuit board or within a photodetector, an optical receiver module may obtain excellent high frequency signal characteristics. However, generally, techniques of integrating a capacitor within a wiring circuit board adjacent to a photodetector or within a photodetector are not easily applied and incur high cost. For example, in a capacitor-integrated photodetector, a large capacitor pad may be formed on a photodetector board through a semiconductor process. However, as a large insulating layer and metal layer process is added, process yield is degraded and a size of a chip is also increased by an area of the capacitor, increasing cost.

Meanwhile, a structure of a photodetector used for optical communication may be generally classified into a plane-incident photodetector (PIN-PD) and a waveguide photodetector. The waveguide photodetector has an operation speed higher than that of the PIN-PD, and thus, the waveguide photodetector may be advantageous for a high speed communication device.

However, in case of an optical module using a multi-channel waveguide photodetector, it is difficult to uniformly form wiring between photodetectors and electric elements and layout thereof on a two-dimensional plane in every channel. In a case where a capacitor is not integrated in a photodetector, the capacitor should be disposed on a side surface of a waveguide photodetector. In this case, however, a length and a shape of bonding wire of each channel are varied, resulting in that it may be difficult to obtain uniform high frequency characteristics for each channel In a receiver optical module, LC resonance may be generated by a photodetector, a capacitor and a bonding wire between the photodetector and the capacitor, by which 3 dB band width characteristics of an OE response of a module can be enhanced. In general, a photodetector may dominantly specify a capacitor value, and a bonding wire may dominantly affect an inductance value. In particular, since an inductance value is determined according to a bonding form and length of a bonding wire, it is important to perform a wire bonding process with a uniform length in order to obtain multi-channel signals with uniform quality.

Meanwhile, a ground may be classified into a high frequency signal ground and a case ground. A ground in a circuit path of a signal may be classified as a signal ground (GND for signal), and an external case may be classified as a case ground. Ideal ground impedance has a potential of 0V, but a signal ground may have a potential difference according to an area and a position in a high frequency. In order to minimize the potential difference, it may be required to form a ground pattern as large as possible and, further, it may be required to form a ground adjacent to an element sensitive to noise in the form of a conductive block and manufactured to be adjacent to a package ground.

SUMMARY

An embodiment of the present invention relates to disposing components of a receiver optical module (optical receiver module) operating in a high frequency (for example, 10 GHz or higher) desirably to make uniform characteristics.

Another embodiment of the present invention relates to an optical receiver module capable of enhancing high frequency signal characteristics by minimizing impedance mismatch.

Another embodiment of the present invention relates to reducing a process, increasing manufacturing yield, and reducing cost by not directly installing a capacitor in a waveguide photodetector of an optical receiver module.

Another embodiment of the present invention relates to enabling a return path of a multi-channel high frequency signal to be uniformly formed on the whole by using a block for a capacitor disposition.

Another embodiment of the present invention relates to easily setting an inductance value of a bonding wire by adjusting a distance between an optical element and a capacitor according to a change in an alignment position of a block for a capacitor disposition.

Another embodiment of the present invention relates to enabling a block for a capacitor disposition to play a role of a ground to supply a stable ground to an optical element and minimizing a voltage difference of a ground supplied to an optical element and a high frequency signal amplifying/processing unit (transimpedance amplifier (TIA)).

Technical subjects of the present invention that may be obtained in the present invention are not limited to the foregoing technical subjects and any other technical subjects not mentioned herein may be easily understood by a person skilled in the art from the present disclosure and accompanying drawings.

A receiver optical module according to an embodiment of the present invention includes: a photodetector having a plurality of channels; a capacitor disposing block formed on an upper portion of the photodetector; a plurality of capacitors formed on the capacitor disposing block; and an electrical wiring configured to connect the plurality of capacitors to electrodes of a plurality of channels of the photodetector, wherein the plurality of capacitors are formed on the capacitor disposing block such that distance between the capacitors and the electrodes of the corresponding channels are the same.

The photodetector may be a waveguide photodetector, and the receiver optical module may further include: a waveguide photodetector aligning block configured to align the waveguide photodetector. Also, the plurality of capacitors may be attached to the capacitor disposing block through a conductive adhesive.

The capacitor disposing block may include a conductive outer cover.

The capacitor disposing block may include two supports and an upper plate.

The photodetector may be formed between the two supports of the capacitor disposing block.

The number of the capacitors may be the same as the number of the channels of the photodetector.

The electrical wiring may be a metal wire.

The number of the metal wires may be the same as the number of the capacitors.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
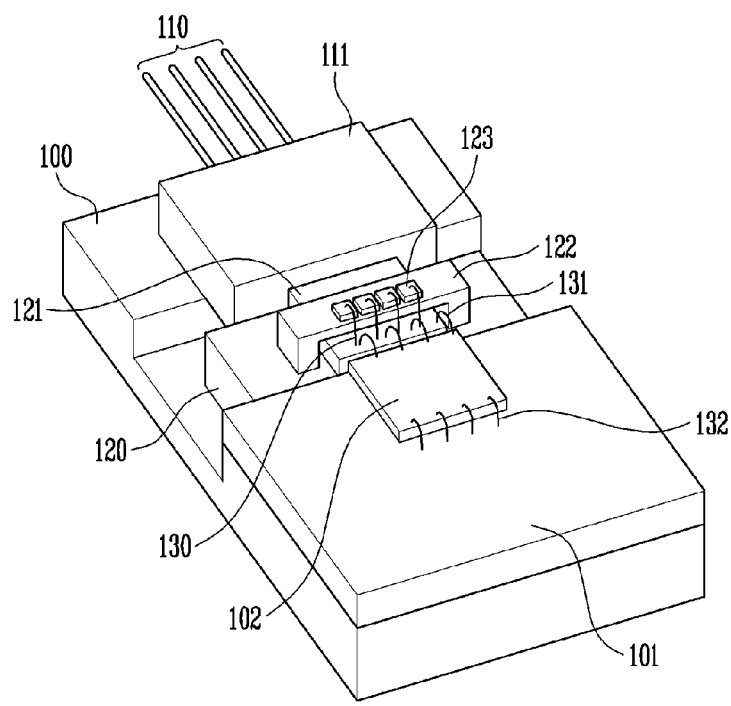
FIG. 1 is a view illustrating an example of a schematic configuration of a receiver optical module according to an embodiment of the present invention.

Hereinafter, embodiments of the present invention will be described in detail with reference to the accompanying drawings.

In describing the present invention, if an embodiment has been well known in the art to which the present invention pertains and technical contents is not directly related to an embodiment of the present disclosure, descriptions thereof will be omitted. This is to allow the embodiment of the present invention to be clearly understood without obscuring the gist of the embodiment of the present disclosure.

It is to be understood that when one element is referred to as being "connected to" or "coupled to" another element, it may be connected directly to or coupled directly to another element or be connected to or coupled to another element, having the other element intervening therebetween. In addition, in the following description, and the word 'including' does not preclude the presence of other components and means that an additional component is included in the technical concept of the present invention.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention.

Also, elements of the embodiments of the present invention are independently illustrated to show different characteristic functions, and it does not mean that each element is configured as separated hardware or a single software component. Namely, for the sake of explanation, respective elements are arranged to be included, and at least two of the respective elements may be incorporated into a single element or a single element may be divided into a plurality of elements to perform a function, and the integrated embodiment and divided embodiment of the respective elements are included in the scope of the present invention unless it diverts from the essence of the present invention.

Also, some of the elements may be optional to merely enhance the performance, rather than being essential to perform a constitutional function. The present invention may be implemented by using only the elements requisite for implement the essence of the present invention, excluding elements used to merely enhance the performance, and a structure including only the essential elements excluding the optional elements merely used to enhance the performance is also included in the scope of the present invention.

In describing embodiments of the present invention, a detailed description of known techniques associated with the present invention unnecessarily obscures the gist of the present invention, it is determined that the detailed description thereof will be omitted. Moreover, the terms used henceforth have been defined in consideration of the functions of the present invention, and may be altered according to the intent of a user or operator, or conventional practice. Therefore, the terms should be defined on the basis of the entire content of this specification.

A receiver optical module (optical receiver module) according to an embodiment of the present invention may minimize distortion due to impedance mismatch of a high frequency signal generated in an optical receiver element and have a structure in which characteristics of high frequency signals between channels are uniform. The receiver optical module may include an optical signal input unit, a photoelectric conversion unit, a high frequency signal amplifying/processing unit, a high frequency signal output unit, a body block supporting the components, and a case.

For example, the optical signal input unit may include at least one of an input optical fiber, a fiber array block, a lens, a filter, a planner light-wave circuit (PLC) element. The photoelectric conversion unit may include at least one of a waveguide photodetector, a waveguide photodetector aligning block (hereinafter, it may be called a PD aligning block), a capacitor, a capacitor disposing block, and a resistor. The high frequency signal amplifying/processing unit may include a transimpedance amplifier (TIA) and an electronic element for driving the TIA. Also, the high frequency signal output unit may include at least one of a printed circuit board and a ceramic sub-mount. The body block may have a conductive outer cover supporting the components.

According to an embodiment, the PD aligning block may be electrically connected to the circuit board, and a waveguide photodetector may be attached to the PD aligning block. A capacitor is not integrated in the waveguide photodetector, and the capacitor may be integrated outside of the waveguide photodetector by using the capacitor disposing block.

According to an embodiment, the capacitor disposing block may be attached as a conductive material in alignment with the waveguide photodetector on the PD aligning block. In this case, a surface or an interior of the capacitor disposing block may be formed with a conductive material and play a role of a common ground.

At this time, a capacitor may be disposed on the capacitor disposing block and may be uniformly disposed to be aligned with a lower photo detector in consideration of a return path of a high frequency signal. According to an embodiment, in case of using a single layer capacitor (SLC), the capacitor disposing block and one side of the capacitor may be bonded with a conductive material so as to be grounded.

Hereinafter, an embodiment of the present invention will be described in detail with reference to the accompanying drawings.

Figure 2:
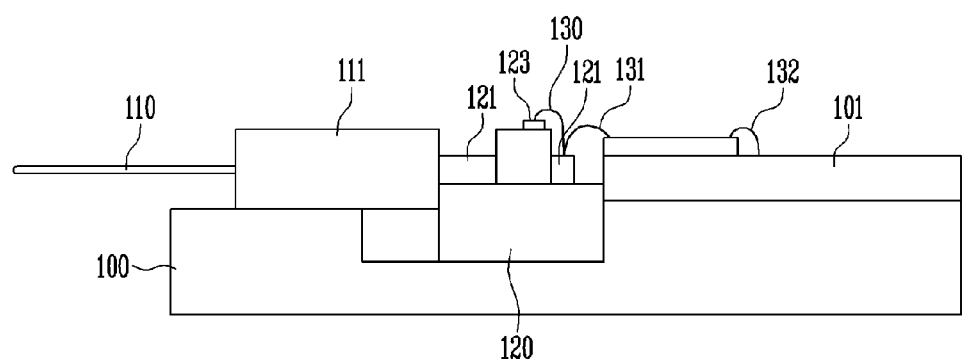
FIG. 2 is a side view illustrating an example of a schematic configuration of a receiver optical module according to an embodiment of the present invention.
Figure 3:
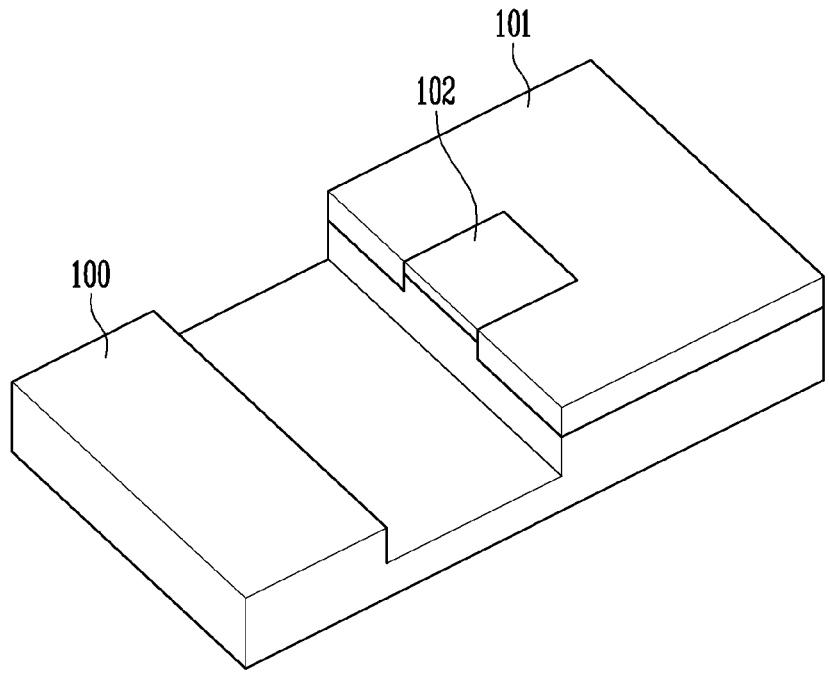
FIG. 3 is a view illustrating an example of a schematic configuration for explaining a body part of a receiver optical module according to an embodiment of the present invention.
Figure 4:
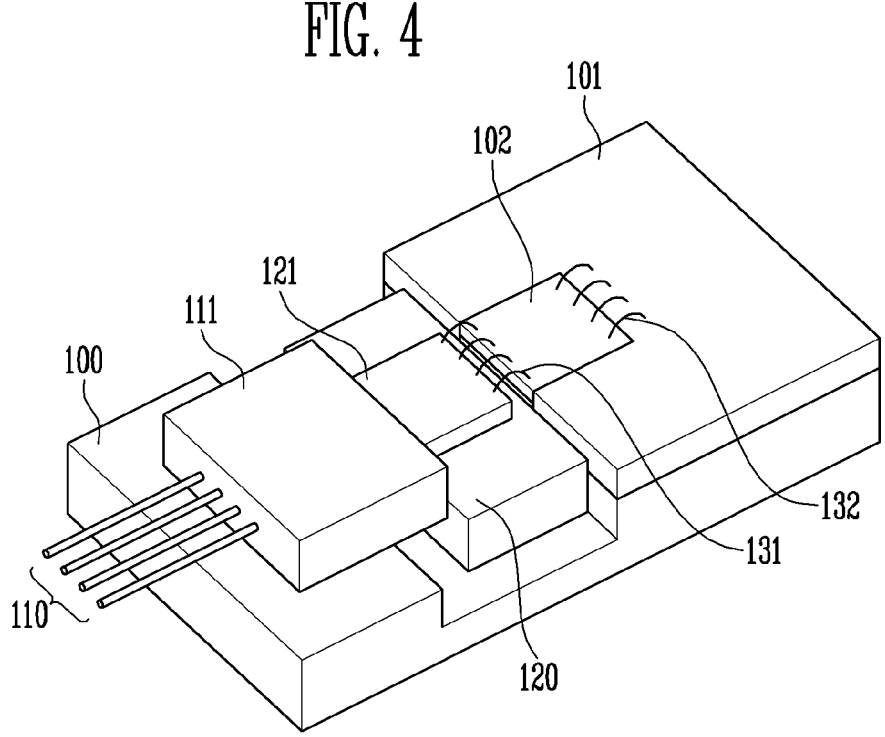
FIG. 4 is a view illustrating an example of a schematic configuration including an optical input unit and a photoelectric conversion unit of a receiver optical module according to an embodiment of the present invention.
Figure 5:
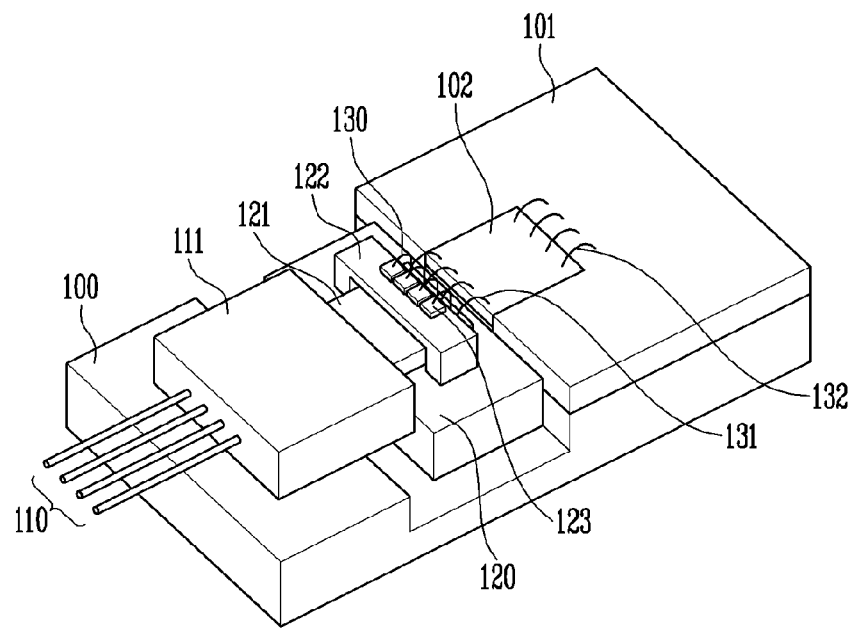
FIG. 5 is a view illustrating an example of a schematic configuration of a receiver optical module according to an embodiment of the present invention, observed at a different angle.

FIG. 1 is a view illustrating an example of a schematic configuration of a receiver optical module according to an embodiment of the present invention, FIG. 2 is a side view illustrating an example of a schematic configuration of a receiver optical module according to an embodiment of the present invention, FIG. 3 is a view illustrating an example of a schematic configuration for explaining a body part of a receiver optical module according to an embodiment of the present invention, FIG. 4 is a view illustrating an example of a schematic configuration including an optical input unit and a photoelectric conversion unit of a receiver optical module according to an embodiment of the present invention, and FIG. 5 is a view illustrating an example of a schematic configuration of a receiver optical module according to an embodiment of the present invention, observed at a different angle.

Referring to FIGS. 1 to 5, a receiver optical module according to an embodiment of the present invention may include a body part (or a body block) 100, optical signal input units 110 and 111, photoelectric conversion units 120, 121, 122, 123, 130, 131, and 132), a high frequency signal amplifying/processing unit 102, and a high frequency signal output unit 101.

The optical signal input unit may include at least one of an input optical fiber 110, an optical fiber block 111, a lens (not shown), a filter (not shown), and a planer light-wave circuit element (not shown), for example. In the drawing, only the input optical fiber 110 and the optical fiber block 111 are illustrated for the sake of explanation, but the present invention is not limited thereto.

The photoelectric conversion unit may include at least one of a waveguide photodetector 121, a waveguide photodetector aligning block (PD aligning block) 120, a capacitor 123, a capacitor disposing block 122, and a resistor (not shown). Here, the waveguide photodetector 121 may include an optical element and play a role of a photodetector. For the convenience of explanation, the term of optical detector and the term of optical element may be mixedly used. The PD aligning block 120 may be called an optical element attachment block and may be provided to attach and align the optical element 121, and the present invention is not limited to the term. The capacitor 123 may be called a metal block and the term is not limited to the return path. The capacitor disposing block 122 may be called a metal block and provided to attach a capacitor and dispose it within the receiver optical module, and the present invention is not limited to the term.

The optical element 121 and the capacitor may be connected through a first electrical wiring 130. Here, according to an embodiment, the electrical wiring 130 may be formed as wire bonding including a metal wire. Thus, the electrical wiring 130 may be called a metal wire.

The high frequency signal amplifying/processing unit may include a transimpedance amplifier (TIA) 102 and an electronic element (not shown) for driving the TIA 102. Here, the optical element 121 and the TIA 102 may be connected through a second electrical wiring 131 and it may be configured as a wire bonding.

The high frequency signal output unit may include at least one of a circuit board 101 and a ceramic sub-mount (not shown). Here, the circuit board 101 and the TIA may be connected through a third electrical wiring 132, and it may be configured as a wire bonding.

In detail, as illustrated in FIG. 3, the electrical circuit board 101 and the TIA 102 may be formed on a body part 100. Here, the TIA 102 may be formed to be higher than the electrical circuit board 101 as illustrated in FIG. 1, or may be formed to have the same height as that of the electrical circuit board 101 as illustrated in FIG. 3. The optical fiber 110 and the optical fiber block 111 may be formed in a region of an upper surface of the body part 100, not a region in which the electrical circuit board 101 and the TIA 102 are formed.

According to an embodiment, a concavely formed region may be present on the upper surface of the body part 100 in order to dispose the photodetector 121 and the PD aligning block 120. The circuit board 101 and the TIA 102 may be formed only at one side of the left and right of the concavely formed region. The input optical fiber 110 and the optical fiber block 111 for displaying the input optical fiber 110 may be formed in a region of the upper surface of the body part 110, not the region in which the circuit board 101 is formed.

The photodetector 121 may be disposed on the upper surface of the body part 100. One end of the photodetector 121 may be aligned to the input optical fiber 110, and the other end may be connected to the TIA 102. Here, the photodetector 121 and the TIA 102 may be connected through the metal wire 131.

Meanwhile, when an optical signal is input from the outside through the input optical fiber 110, the optical signal may be photoelectrically converted by the photodetector 121 and output as a high frequency electrical signal. The output high frequency electrical signal may be transferred to the TIA 102 through the metal wire 131 so as to be amplified, and transferred to a final output terminal through the electrical circuit board 101.

Here, according to an embodiment, a planar lightwave circuit (PLC) element, a lens, or a filter may be added between the input optical fiber 110 and the photodetector 121 to demodulate an optical signal.

In an embodiment, a material of the waveguide photodetector 121 is weak and a thickness of the waveguide photodetector 121 is as thin as hundreds of micrometers, and thus, it is difficult to be aligned with the optical signal input unit by the element itself. In order to help this, the PD aligning block 120 may be used.

An operating voltage should be applied to the waveguide photodetector 121, and in order to enhance RF characteristics, a capacitor 123 playing a role of an RF return path should be disposed within a short distance. In particular, the waveguide photodetector 121 for communication is used in the form of array of a few channels in many cases. When an array of three or more waveguide photodetectors 121 are used, it may be difficult to uniformly dispose distances from an electrode of each of the waveguide photodetectors 121 to the capacitor 123 and uniformly maintain a shape of a bonding wire and the distance on a two-dimensional plane.

Thus, in the receiver optical module according to an embodiment of the present invention, the capacitor 123 may be disposed such that a distance to the electrode of each of the waveguide photodetector 121 is the same by using the capacitor disposing block 122. That is, the capacitor 123 may not be integrated in the waveguide photodetector 121 and may be formed on the capacitor disposing block 122 outside of the waveguide photodetector 121. Here, when an arrangement of a plurality of waveguide photodetectors 121 is used, the plurality of capacitors 123 may be formed on the capacitor disposing block 122 such that a distance between the electrode of each of the waveguide photodetectors 121 and each corresponding capacitor 123 is the same.

Referring to FIG. 1 or 5, the waveguide photodetector 121 may be disposed on the PD aligning block 120. Here, the waveguide photodetector 121 may be used in the form of array of a few channels, and for example, the waveguide photodetector 121 may be a four-channel waveguide photodetector 121. Also, the capacitor disposing block 122 may be formed on the four-channel waveguide photodetector 121, and a plurality of capacitors 123 may be aligned on the capacitor disposing block 122. Here, since the waveguide photodetector 121 has four channels, four capacitors 123 corresponding thereto may be disposed on the capacitor disposing block 122. For example, four channels of the waveguide photodetector 121 may be formed in a length direction of the optical fiber 110. That is, four electrodes of the waveguide photodetector 121 may be formed in a direction perpendicular to the light transmittance direction of the optical fiber 110. Thus, in order to dispose the capacitor corresponding to the electrode of the waveguide photodetector 121 to have the same distance, the capacitor 123 may be disposed to be parallel to the electrode of the waveguide photodetector 121 on the capacitor disposing block 122 as illustrated in FIG. 1 or 5.

Meanwhile, according to an embodiment, the capacitor 123 may be attached to the capacitor disposing block 122 by using a conductive adhesive. The capacitor disposing block 122 may have a conductive outer cover and may be made of a material having characteristics that are not easily bent. For example, the capacitor disposing block 122 may include a CuW material.

Also, according to an embodiment, the capacitor disposing block 122 may include two or more supports and one flat panel. The capacitor 123 may be disposed on the flat panel, and the photodetector 121 may be positioned between the two supports.

Also, as described above, the photodetector 121 may be a waveguide photodetector 121 in which three or more optical elements are arrayed, and the number of capacitors 123 may be the same as the number of the array of the optical elements. Also, the number of the capacitors 123 and the number of the metal wires 130 connecting the capacitors 132 and the photodetector 121 may be the same. That is, the optical element arrangement of the photodetector 121 and the capacitors 123 are connected in a one-to-one manner, they may be connected by the metal wires 130. Here, the metal wires 130 may be uniformly disposed to have a similar length and shape.

On the other hand, according to an embodiment, the PD aligning block 120 may configure a circuit inside or outside as necessary.

Figure 6:
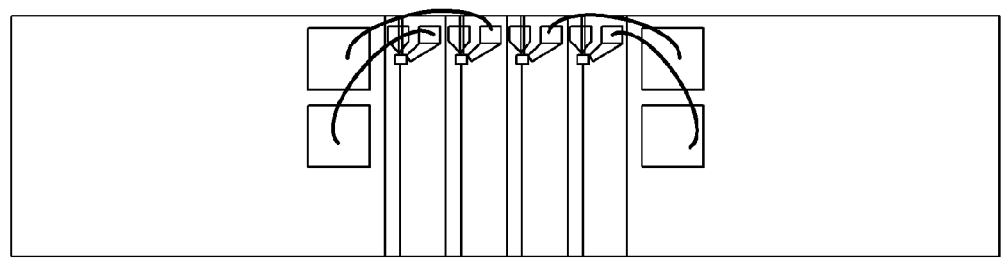
FIG. 6 is a view illustrating an example of wire bonding when a capacitor disposing block is not used.
Figure 7:
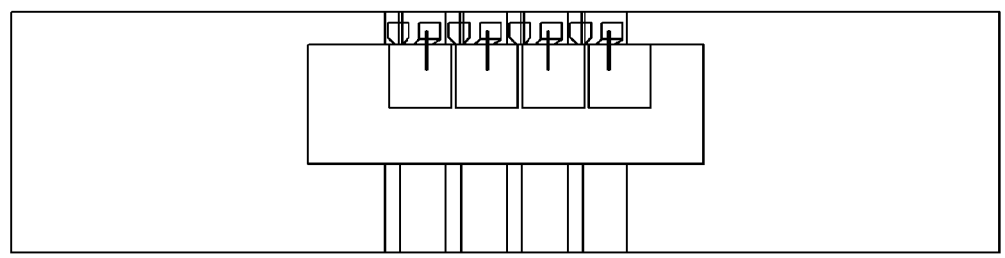
FIG. 7 is a view illustrating an example of wire bonding when a capacitor disposing block is used according to an embodiment of the present invention.

FIG. 6 is a view illustrating an example of wire bonding when the capacitor disposing block is not used, and FIG. 7 is a view illustrating an example of wire bonding when the capacitor disposing block according to an embodiment of the present invention is used.

Referring to FIG. 6, an example in which the capacitor disposing block 122 according to an embodiment of the present invention is not used and a capacitor and an optical element are disposed on an upper two-dimensional plane of the PD aligning block is illustrated. In this case, even though the optical element of four channel array and four capacitors are preferably disposed to uniformly dispose bond wire of four channels, the bonding wires are connected to the capacitors by having different lengths and directions as illustrated. Also, in order to connect the optical element and the capacitors without contacting a different bonding wire adjacent to the bonding wire, the bonding wire should have a shape of drawing a high parabola. Here, in order to perform wire bonding to have a parabola shape higher than that of a general wire bonding on purpose, a worker of the wire bonding should work by manually adjusting the height, and thus, work repetition uniformity may be degraded and the length of the wire bonding may be irregular.

Thus, referring to FIG. 7, an example in which three-dimensional packaging is performed by using the capacitor disposing block 122 is illustrated. That is, as illustrated in FIG. 7, each capacitor may be disposed to be arranged to be parallel to electrodes of the channels of a plurality of corresponding optical elements. Each capacitor may be connected to the electrode of the corresponding optical element through bonding wire. Here, the bonding wire does not intersect with other adjacent bonding wire, and thus, it is not necessary to perform the processing to make the wire to have a high parabola shape. Also, since all the bonding wires are disposed to be parallel, the bonding wires are uniformly affected by an external environment. Also, since start points and end points of all the bonding wires are parallel, the length may be uniform.

Figure 8:
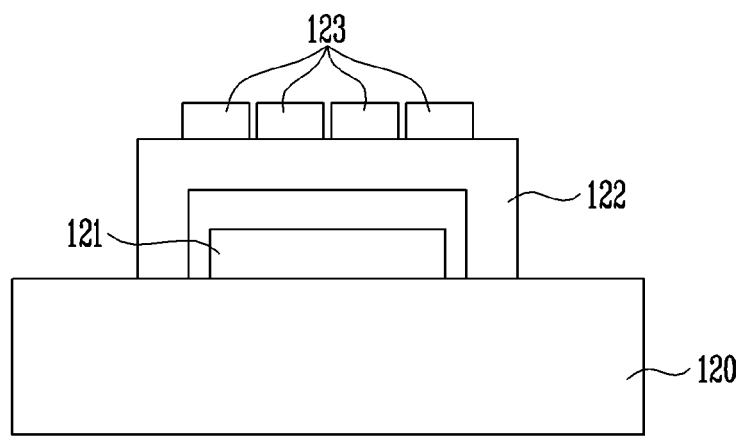
FIG. 8 is a view illustrating an example of a cross-section of a receiver optical module in one direction according to an embodiment of the present invention.
Figure 9:
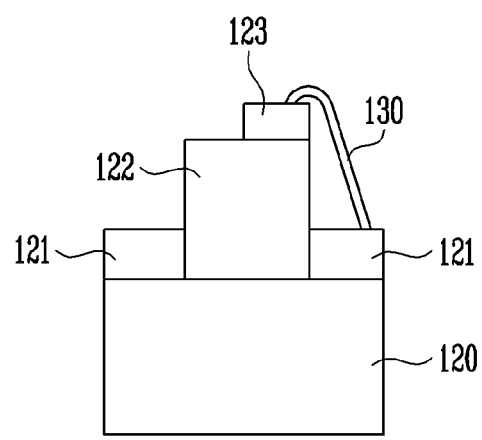
FIG. 9 is a view illustrating an example of a cross-section of a receiver optical module in another direction according to an embodiment of the present invention.

FIG. 8 is a view illustrating an example of a cross-section of a receiver optical module in one direction according to an embodiment of the present invention, and FIG. 9 is a view illustrating an example of a cross-section of a receiver optical module in another direction according to an embodiment of the present invention.

Referring to FIG. 8, four-channel waveguide photodetector 121 may be disposed on an upper portion of the PD aligning block 120, for example. The capacitor disposing block 122 is formed on the PD aligning block 120, and four capacitors 123 may be disposed on the capacitor disposing block 122, for example.

A distance between a side wall of the waveguide photodetector 121 and a side wall of the capacitor disposing block 122 may be formed in consideration of a component fabrication precision and assembly precision, and may be formed to have clearance of about 50 um, for example. The capacitors 123 may be disposed directly above each waveguide photodetector 121 and formed such that four electrodes are connected to be parallel and evenly.

Referring to FIG. 9, an upper plate of the capacitor disposing block 122 may have a small thickness within a range in which it is not bent when the capacitors 123 are mounted thereon and force is applied for wire bonding. Here, although different according to a material and a shape of the capacitor disposing block 122, a thickness of an upper plate of the capacitor disposing block 122 in case of a CuW material may be formed to be about 50 to 120 um.

Also, according to an embodiment, height clearance between the photodetector 121 and the capacitor disposing block 122 may be designed in consideration of size precision of each component and bending of the upper plate of the capacitor disposing block 122. For example, a thickness of the upper plate of the capacitor disposing block 122 may be about 50 to 120 um, and height clearance between the photodetector 121 and the capacitor disposing block 122 may be about 65 to 85 um or about 75 um. In this case, the length of the wire bonding may be shorter than a case in which the capacitor 123 is disposed on a two-dimensional plane.

On the other hand, according to an embodiment, the capacitor disposing block 122 may be fabricated with a conductive material. In this case, the capacitor disposing block 122 may be used as a ground block. Here, the single layer capacitor 123 may be directly attached to the upper plate of the capacitor disposing block 122 so that one side may be grounded. In this case, since the capacitor 123 is not grounded by a transmission line, or the like, but is directly surface-grounded to the ground block, a difference in ground voltage that may be generated from high frequency may be maintained to be smaller.

According to the embodiment of the present invention, by disposing components of a receiver optical module (optical receiver module) operating in a high frequency (for example, 10 GHz or higher) desirably, high frequency characteristics between channels can become uniform.

Also, an optical receiver module capable of enhancing high frequency signal characteristics by minimizing impedance mismatch can be provided.

Also, since a capacitor is not directly installed in a waveguide photodetector of an optical receiver module, a process can be reduced, manufacturing yield can be increased, and cost can be reduced.

Also, since a block for a capacitor disposition is used, a return path of a multi-channel high frequency signal can be formed to be uniform on the whole.

Also, since a distance between an optical element and a capacitor can be adjusted by changing an alignment position of a block for a capacitor disposition, an inductance value of a bonding wire can be easily set.

Also, since a block for a capacitor disposition plays a role of a ground, a stable ground can be provided to an optical element and a voltage difference of a ground supplied to an optical element and a high frequency signal amplifying/processing unit (transimpedance amplifier (TIA)) can be minimized Also, in the receiver optical module according to an embodiment of the present invention, distortion and loss of high frequency signal characteristics can be reduced and quality of a signal can be enhanced.

Advantages and effects of the present invention that may be obtained in the present invention are not limited to the foregoing effects and any other technical effects not mentioned herein may be easily understood by a person skilled in the art from the present disclosure and accompanying drawings.

Embodiments of the present invention described in detail hereinabove are proposed for the purpose of describing particular embodiments only and not intended to be limiting of the invention. In addition to the embodiments of the present invention illustrated and described herein, it would be obvious to those skilled in the art that various other changes and modifications can be made without departing from the spirit and scope of the invention.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A receiver optical module comprising:
    a photodetector having a plurality of channels;
    a capacitor disposing block formed on an upper portion of the photodetector;
    a plurality of capacitors formed on the capacitor disposing block; and
    an electrical wiring configured to connect the plurality of capacitors to electrodes of a plurality of channels of the photodetector,
    wherein the plurality of capacitors are formed on the capacitor disposing block such that distance between the capacitors and the electrodes of the corresponding channels are the same,
    wherein the photodetector is a waveguide photodetector, and
    wherein the receiver optical module further comprising:
    a waveguide photodetector aligning block configured to align the waveguide photodetector.

2. The receiver optical module of claim 1, wherein the plurality of capacitors are attached to the capacitor disposing block through a conductive adhesive.

3. The receiver optical module of claim 1, wherein the capacitor disposing block includes a conductive outer cover.

4. The receiver optical module of claim 1, wherein the capacitor disposing block includes two supports and an upper plate.

5. The receiver optical module of claim 4, wherein the photodetector is formed between the two supports of the capacitor disposing block.

6. The receiver optical module of claim 1, wherein the number of the capacitors is the same as the number of the channels of the photodetector.

7. The receiver optical module of claim 1, wherein the electrical wiring is a metal wire.

8. The receiver optical module of claim 7, wherein the number of the metal wires is the same as the number of the capacitors.

9. The receiver optical module of claim 8, wherein lengths of the metal wires are the same.

10. The receiver optical module of claim 1, wherein each of the plurality of capacitors is disposed such that a distance from each of the plurality of capacitors to a corresponding one of the plurality of channels is the same.

11. The receiver optical module of claim 1, further comprising:
a body part having a concavely formed region,
wherein the waveguide photodetector aligning block is disposed in the concavely formed region.

12. The receiver optical module of claim 11, further comprising:
a circuit board and a transimpedance amplifier disposed at one side of the concavely formed region; and
an input optical fiber and an optical fiber block disposed at the other side of the concavely formed region,
wherein, when an optical signal is input from an outside through the input optical fiber, the optical signal is photoelectrically converted by the photodetector and output as a high frequency electrical signal, and
wherein the output high frequency electrical signal is transferred to the transimpedance amplifier through the metal wire so as to be amplified, and transferred to a final output terminal through the electrical circuit board.

13. The receiver optical module of claim 12, wherein the plurality of capacitors are arranged in a direction perpendicular to a length direction of the input optical fiber.

14. The receiver optical module of claim 1, wherein the capacitor disposing block includes a CuW material.

* * * * *